(12) United States Patent
Jang et al.

(10) Patent No.: US 10,172,168 B2
(45) Date of Patent: Jan. 1, 2019

(54) IOT DEVICE, MOBILE TERMINAL AND METHOD FOR CONTROLLING THE IOT DEVICE WITH VIBRATION PAIRING

(71) Applicant: LG ELECTRONICS INC., Seoul (KR)

(72) Inventors: Younkyung Jang, Seoul (KR); Cheol Choi, Seoul (KR); Chamo Je, Seoul (KR); Sungjun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/424,483

(22) Filed: Feb. 3, 2017

(65) Prior Publication Data
US 2017/0231015 A1 Aug. 10, 2017

Related U.S. Application Data

(60) Provisional application No. 62/291,535, filed on Feb. 5, 2016.

(30) Foreign Application Priority Data

Jun. 3, 2016 (KR) .................. 10-2016-0069783

(51) Int. Cl.
*H04W 76/00* (2018.01)
*H04W 76/10* (2018.01)
(Continued)

(52) U.S. Cl.
CPC .......... *H04W 76/10* (2018.02); *G06F 3/016* (2013.01); *G06F 3/043* (2013.01); *G08B 6/00* (2013.01);
(Continued)

(58) Field of Classification Search
CPC ..... H04W 76/02; H04W 84/18; H04W 4/005; H04W 12/04; H04W 12/06; H04L 67/12;
(Continued)

(56) References Cited

U.S. PATENT DOCUMENTS

| 2011/0053558 | A1 | 3/2011 | Teague |
| 2015/0098308 | A1 | 4/2015 | Herman et al. |
| 2016/0378996 | A1* | 12/2016 | Smith .................. G06F 21/602 |
| | | | 713/190 |

(Continued)

FOREIGN PATENT DOCUMENTS

| KR | 10-2012-0055833 A | 6/2012 |
| KR | 10-1581632 B1 | 12/2015 |
| WO | WO 2016/208802 A1 | 12/2016 |

OTHER PUBLICATIONS

Park et al., "Vibration Based Tangible Tokens for Intuitive Pairing Among Smart Devices," Network and Parallel Computing, vol. 9750, Chapter 5, No. 558, XP047349217, Jun. 21, 2016, pp. 48-56.

*Primary Examiner* — Thanh Le

(74) *Attorney, Agent, or Firm* — Birch, Stewart, Kolasch & Birch, LLP

(57) ABSTRACT

The present invention relates to an IoT (Internet of Things) device, a mobile terminal, a method of pairing the IoT device using the mobile terminal, and a control method. According to one embodiment of the present invention, the method includes the steps of, when an IoT device contacted with at least one side of the mobile terminal is recognized, generating a vibration using a designated vibration pattern, receiving vibration pattern information from the IoT device, and when the received vibration pattern information is identical to the designated vibration pattern, performing paring with the IoT device. According to the embodiments of the present invention, a user can intuitively perform pairing between the mobile terminal and the IoT device through the paring method between the mobile terminal and the IoT device.

4 Claims, 16 Drawing Sheets

(51) Int. Cl.
| | |
|---|---|
| *G08B 6/00* | (2006.01) |
| *H04L 29/08* | (2006.01) |
| *G06F 3/01* | (2006.01) |
| *G06F 3/043* | (2006.01) |
| *H04B 11/00* | (2006.01) |
| *H04M 1/725* | (2006.01) |
| *H04Q 9/00* | (2006.01) |
| *H04W 12/04* | (2009.01) |
| *H04W 4/80* | (2018.01) |
| *H04W 84/18* | (2009.01) |
| *H04W 4/70* | (2018.01) |

(52) U.S. Cl.
CPC .............. *H04B 11/00* (2013.01); *H04L 67/12* (2013.01); *H04M 1/7253* (2013.01); *H04Q 9/00* (2013.01); *H04W 12/04* (2013.01); *G08C 2201/93* (2013.01); *H04Q 2209/43* (2013.01); *H04W 4/70* (2018.02); *H04W 4/80* (2018.02); *H04W 84/18* (2013.01)

(58) Field of Classification Search
CPC ......... G06F 21/602; G08B 6/00; G08B 19/00; H04M 1/72533
See application file for complete search history.

(56) References Cited

U.S. PATENT DOCUMENTS

| | | | |
|---|---|---|---|
| 2016/0381201 A1* | 12/2016 | Park | H04M 1/72533 455/557 |
| 2017/0004692 A1* | 1/2017 | Britt | G08B 19/00 |

\* cited by examiner

FIG. 10

| Application type | Pattern # | Pattern type / parameters |
|---|---|---|
| music control | 1 | P1 set |
| lost child prevention | n | Pn set |
| ... | ... | ... |
| light control | k | Pk set |

1001 — music control row
1002 — lost child prevention row
1003 — light control row

IOT DEVICE, MOBILE TERMINAL AND METHOD FOR CONTROLLING THE IOT DEVICE WITH VIBRATION PAIRING

CROSS REFERENCE TO RELATED APPLICATIONS

This application claims priority under 35 U.S.C. § 119(e) to U.S. Provisional Application No. 62/291,535, filed on Feb. 5, 2016 and under 35 U.S.C. § 119(a) to Patent Application No. KR10-2016-0069783 filed in the Republic of Korea on Jun. 3, 2016, all of which are hereby expressly incorporated by reference into the present application.

BACKGROUND OF THE INVENTION

Field of the Invention

The present invention relates to an IoT device, a mobile terminal and a method of pairing and controlling the IoT device using the mobile terminal.

Discussion of the Related Art

Generally, terminals can be classified into mobile terminals and stationary terminals according to a presence or non-presence of mobility. And, the mobile terminals can be further classified into handheld terminals and vehicle mount terminals according to availability for hand-carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As the functions of the terminals are diversified, for example, the terminals are implemented in a form of a multimedia player equipped with complex functions such as capturing pictures or videos, playing music and video files, gaming, receiving broadcasting, and the like. Efforts are ongoing to support and increase the functionality of mobile terminals. Such efforts include software and hardware improvements, as well as changes and improvements in the structural components.

Recently, a wireless communication device such as an IoT (Internet of Things) device is developing. The IoT corresponds to a technology or environment that data is transmitted and received in real time by attaching a sensor to an object. The IoT device corresponds to a device which is developed to implement the IoT. Currently, IoT devices of various types are developing. In general, since it is necessary for the IoT device to have a wireless communication function to perform communication with a different device, for example, Bluetooth technology is widely used as a short-distance wireless communication technology, by which the present invention may be non-limited. It may be able to apply any short-distance wireless communication technology to the present invention.

Moreover, a small IoT device is recently developing to have a simple exterior, portability, and a function to perform a programmed specific function. In relation to this, FIGS. 1a to 1d illustrate examples of various exteriors of the small IoT device. For instance, a small IoT device shown in FIG. 1a has a circle shape not including a display screen (e.g., LCD screen window) or an input button. Instead, LED indication light is installed at the top of the small IoT device. FIG. 1b shows a small IoT device of a circle shape, FIG. 1c shows a small IoT device of a rectangular shape, and FIG. 1d shows a small IoT device of a star shape, respectively. However, it is apparent that a small IoT device of a different shape may exist rather than the IoT devices shown in FIGS. 1a to 1d. The present invention relates to an internal configuration and a function of a small IoT device rather than a shape of the small IoT device. The internal configuration and the function of the small IoT device related to the present invention shall be explained in detail later.

In general, the small IoT device is utilized in a manner of being paired with a mobile terminal. In relation to this, since the shape of the small IoT device is similar and a case of using a plurality of small IoT devices frequently occurs, when a user pairs the small IoT device with a mobile terminal, the user feels inconvenience. A method of paring a legacy small IoT device with a mobile terminal is described in the following.

FIG. 2a shows a case that a plurality of IoT devices 201/202/203/204/205 exist near a mobile terminal 100. For example, assume that a user of the mobile terminal 100 intends to pair an IoT device 201 located at the top with the mobile terminal 100 among a plurality of the IoT devices 201/202/203/204/205. Yet, since it is difficult for a general user who has no professional knowledge and experience to precisely recognize a device name (e.g., "Monkey::ba56") of the IoT device 201 to be paired, the user feels inconvenience in the case of performing the pairing. And, according to Bluetooth standard (or Bluetooth low energy mode (BLE) standard), a unique identification number (UUID: universally unique identifier) configured by 128 bits is assigned according to an IoT device to identify the IoT device. However, it is very difficult for a user to precisely recognize the device identification number (UUID) in addition to the device name (e.g., "Monkey::ba56", "Monkey::dabd", etc.)

FIG. 2b shows a result that a user executes a short-distance communication device search function (e.g., "BLE device scan function") of the mobile terminal 100. As a result, as shown in FIG. 2b, device names and identification numbers (UUIDs) of a plurality of Bluetooth devices 202 to 208 existing near the mobile terminal are provided to a search result screen of the mobile terminal. For example, devices displayed as 202 to 205 in the search screen correspond to the small IoT devices existing near the mobile terminal shown in FIG. 2a. And, for example, devices displayed as 206 to 208 in the search screen correspond to other wireless communication devices (e.g., smartphone, notebook, etc.) existing within a short-distance communication range of the mobile terminal 100.

Subsequently, a user may select a device to be paired with the mobile terminal from among the devices displayed in the search screen. However, if the user does not know an accurate device name or an identification number (UUID) of a preferred IoT device (e.g., 201 "Monkey::ba56"), the user may select a wrong device and pairs the wrong device with the mobile terminal or the user may abandon pairing. And, although the user is aware of an accurate device name or an identification number (UUID) of a preferred IoT device, it is necessary for the user to perform a plurality of steps, e.g., a scanning step, a selection step, and a connection step, to perform pairing with the device. Hence, there exists inconvenience.

Therefore, the present invention intends to provide a pairing method capable of intuitively and conveniently performing pairing between a mobile terminal and an IoT device. In relation to this, as an example, although the present invention is explained with an example of an IoT device, it is apparent that the present invention can also be applied to all small Bluetooth devices needed to be paired with a mobile terminal.

SUMMARY OF THE INVENTION

Accordingly, the present invention is directed to an apparatus and method thereof that substantially obviate one or more problems due to limitations and disadvantages of the related art. An object of the present invention is to provide an intuitive and convenient pairing method between a mobile terminal and a small IoT device.

Another object of the present invention is to implement a plurality of application functions in the IoT device using the paring method.

The other object of the present invention is to provide a mobile terminal structure and an IoT device structure to implement intuitive and convenient pairing.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of paring an IoT (Internet of things) device using a mobile terminal, includes the steps of, if an IoT device contacted with at least one side of the mobile terminal is recognized, generating a vibration using a designated vibration pattern, receiving vibration pattern information from the IoT device, and if the received vibration pattern information is identical to the generated vibration pattern, performing paring with the IoT device.

Preferably, if the IoT device is contacted with the top of a screen of the mobile terminal, one of a plurality of predefined vibration patterns can be generated.

Preferably, a plurality of the vibration patterns can be configured to respectively correspond to a plurality of applications of the mobile terminal.

Preferably, if a plurality of application screens are displayed in the screen of the mobile terminal and the IoT device is contacted with the top of a displayed specific application screen, a vibration pattern corresponding to the application can be generated.

Preferably, the method can further include the step of transmitting a data suitable for a type of the application after the pairing is performed.

To further achieve these objects and other advantages and in accordance with the purpose of the invention, as embodied and broadly described herein, according to a different embodiment, a mobile terminal includes a wireless communication unit configured to transceive data with an IoT (Internet of Things) device, a touch screen configured to recognize a contact of the IoT device, and a controller, if the contact of the IoT device is recognized, configured to generate a vibration using a designated vibration pattern, the controller, if vibration pattern information identical to the vibration pattern is received from the IoT device, configured to perform pairing with the IoT device through the wireless communication unit.

Preferably, the mobile terminal can further include a memory configured to store application programs and vibration pattern information.

Preferably, the memory is configured to store a plurality of application programs and store a plurality of vibration pattern information respectively corresponding to the application programs.

Preferably, if a plurality of application screens are displayed in the touch screen and the IoT device is contacted with the top of a displayed specific application screen, a vibration pattern corresponding to the application can be generated.

Preferably, the controller is configured to transmit a data suitable for a type of the application after the pairing is performed.

Preferably, a vibration area is separately configured on the touch screen and a vibration is generated using the designated vibration pattern only when the IoT device is contacted with the vibration area.

To further achieve these objects and other advantages and in accordance with the purpose of the invention, as embodied and broadly described herein, according to a further different embodiment, an IoT (Internet of Things) device includes a wireless communication means configured to transceive data with a mobile terminal, a sensor configured to recognize a vibration generated from the external, a memory configured to store information on at least one or more vibration patterns, and a controller configured to receive a vibration signal generated by the mobile terminal through the sensor, the controller configured to provide the mobile terminal with information on a vibration pattern matched with the generated vibration among the stored information on the vibration patterns, the controller configured to perform pairing with the mobile terminal.

Preferably, the memory is configured to store at least one or more application program data.

Preferably, the controller is configured to perform a plurality of application functions at the same time after pairing per application is performed.

Preferably, the controller is configured to download a plurality of application program data from the mobile terminal after pairing is performed one time.

Preferably, the controller is configure to perform one application function only, after pairing per application is performed.

To further achieve these objects and other advantages and in accordance with the purpose of the invention, as embodied and broadly described herein, according to a different embodiment, a method of paring an IoT (Internet of things) device using a mobile terminal, includes the steps of, if an IoT device contacted with at least one side of the mobile terminal is recognized, generating a vibration using a designated vibration pattern, if the IoT device recognizes the vibration pattern, performing a first step to perform pairing for implementing an application defined between the mobile terminal and the IoT device; and performing a second step to perform data transmission and reception between the mobile terminal and the IoT device according to the defined application after the pairing. In this case, the IoT device paired with the mobile terminal through the first step performs the defined application function only.

To further achieve these objects and other advantages and in accordance with the purpose of the invention, as embodied and broadly described herein, according to a further different embodiment, a method of paring an IoT (Internet of things) device using a mobile terminal, includes the steps of, if an IoT device contacted with at least one side of the mobile terminal is recognized, generating a vibration using a designated vibration pattern, if the IoT device recognizes the vibration pattern, performing a first step to perform pairing for implementing an application defined between the mobile terminal and the IoT device; and performing a second step to perform data transmission and reception between the mobile terminal and the IoT device according to the defined application after the pairing. In this case, if it is necessary to add an application of a different function rather than the defined application to the paired IoT device, the first and the second steps are performed on the added application again and the IoT device performs a plurality of application functions in a single device.

According to embodiments of the present invention, a user can intuitively pair a mobile terminal with an IoT device through a paring method between the mobile terminal and the IoT device.

According to embodiments of the present invention, it is not necessary to perform steps generally performed for a legacy IoT device paring including a scanning step, a selection step, and a connection step. If an IoT device is contacted with a mobile terminal, since the mobile terminal is automatically paired with the IoT device in a manner of being interacted with each other, it is able to reduce unnecessary connection waiting time.

According to embodiments of the present invention, a user is able to utilize an IoT device equipped with a plurality of application functions selected by the user through a pairing method between a mobile terminal and the IoT device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 is a diagram for an example of a vibration pattern type which is defined according to an application used in the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
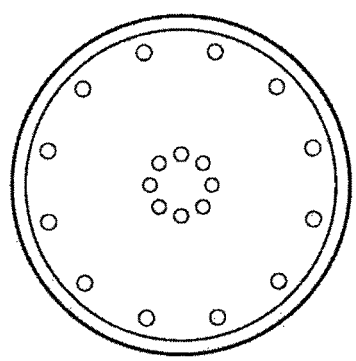
FIGS. 1a to 1d illustrate an example of an exterior of an IoT device according to the present invention.
Figure 1B:
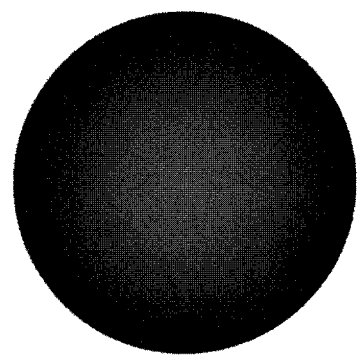
Figure 1C:
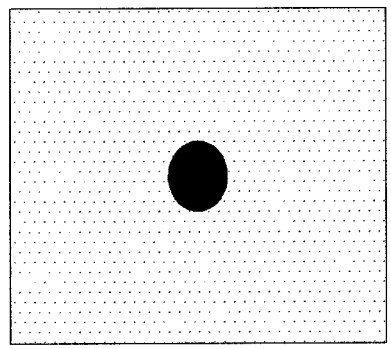
Figure 1D:
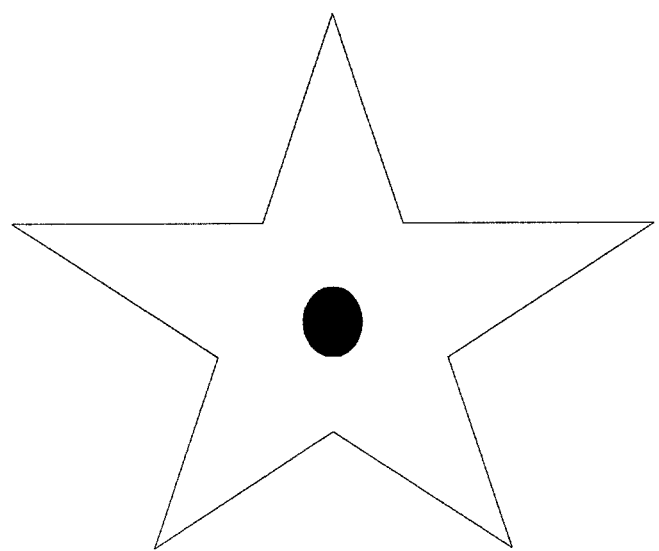
Figure 2A:
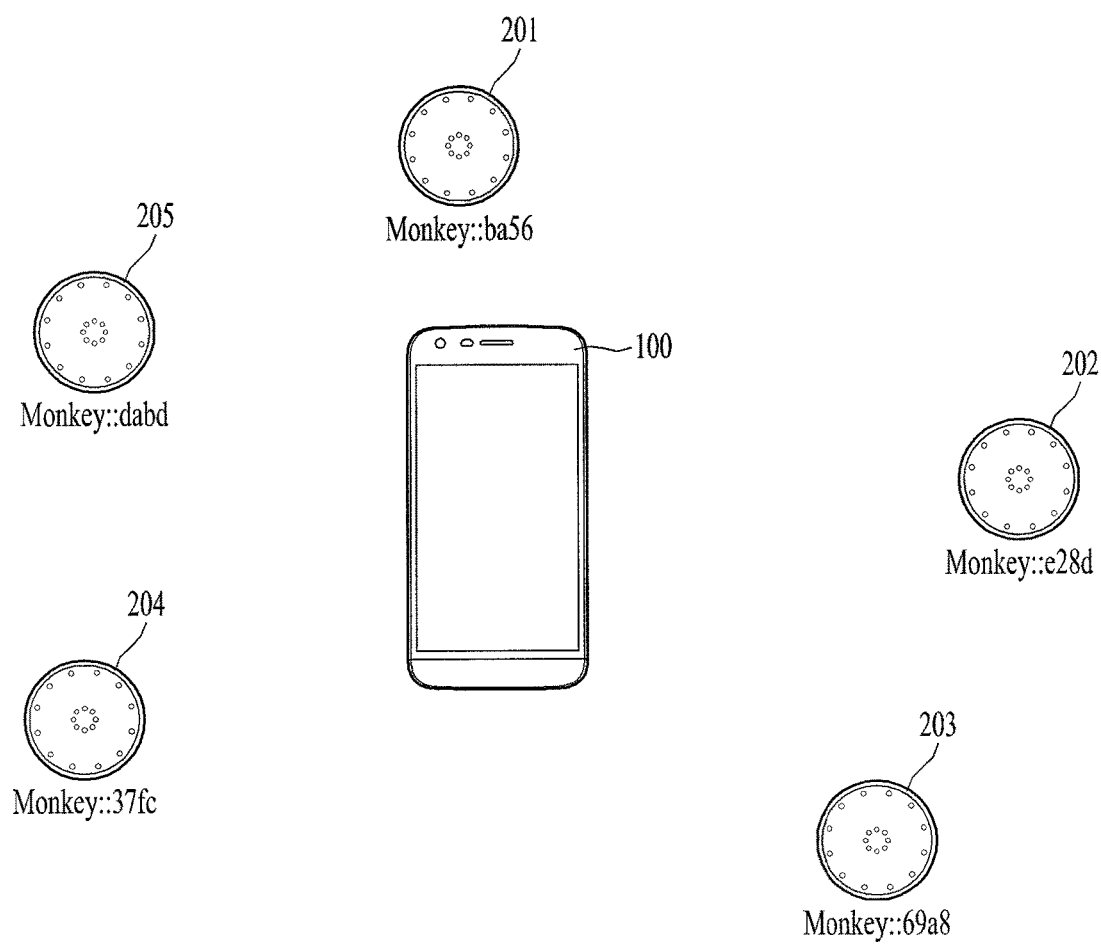
FIGS. 2a and 2b are diagrams for explaining a pairing method between a legacy mobile terminal and an IoT device.
Figure 2B:
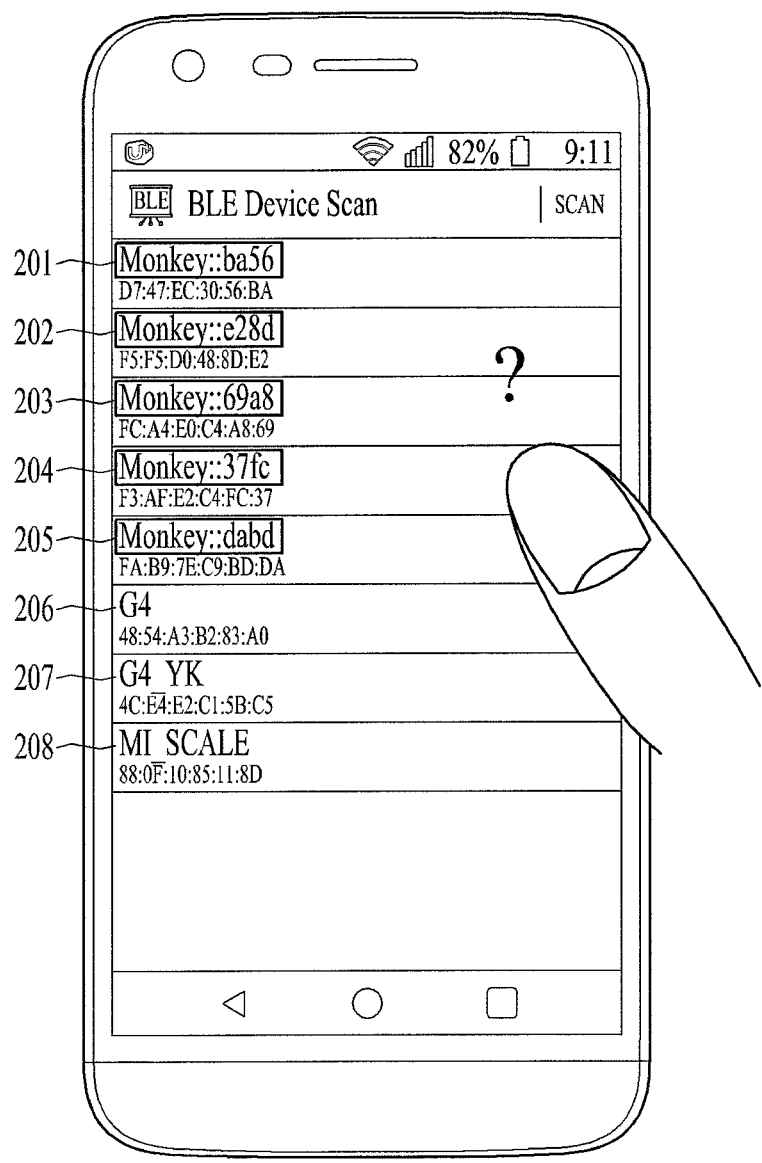
Figure 3A:
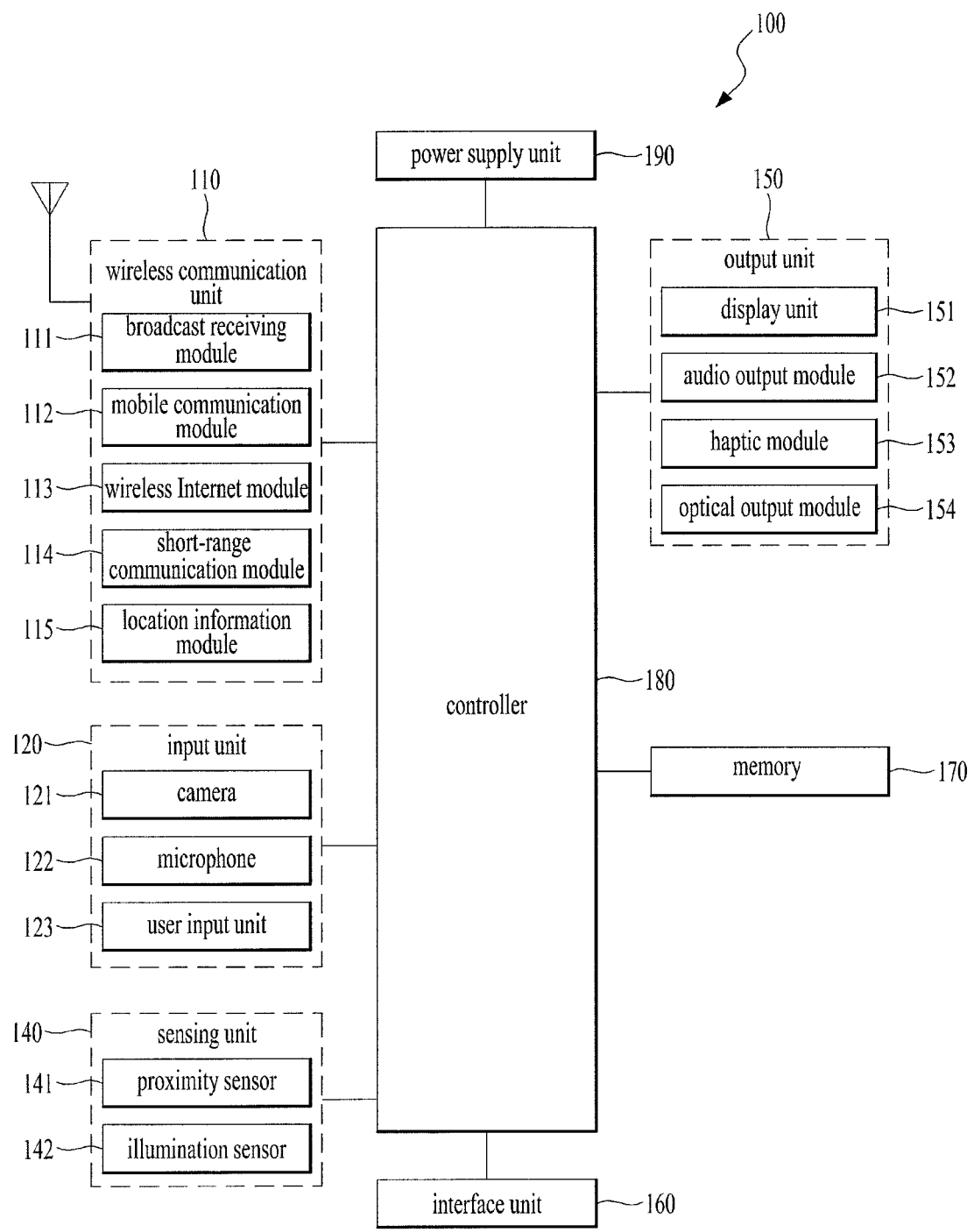
FIG. 3a is a block diagram for explaining a mobile terminal according to the present invention.
Figure 3B:
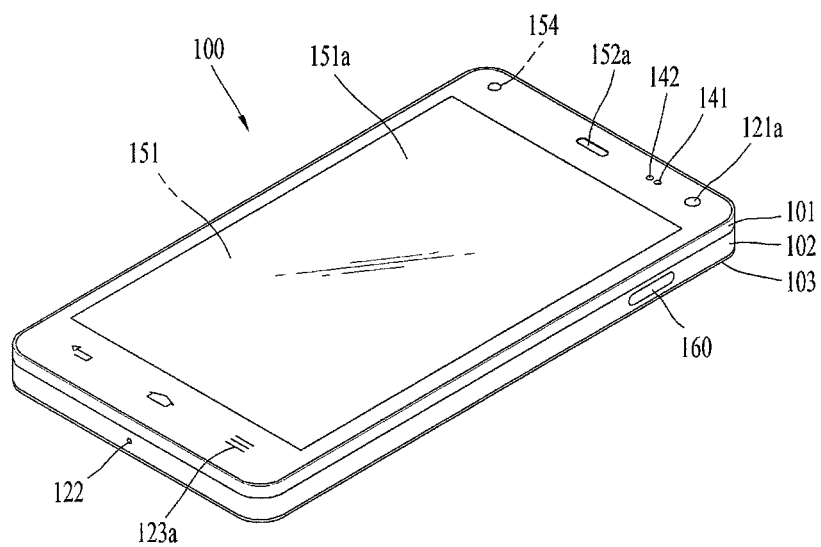
FIGS. 3b and 3c are conceptual diagrams for a mobile terminal according to the present invention seen from a different direction.
Figure 3C:
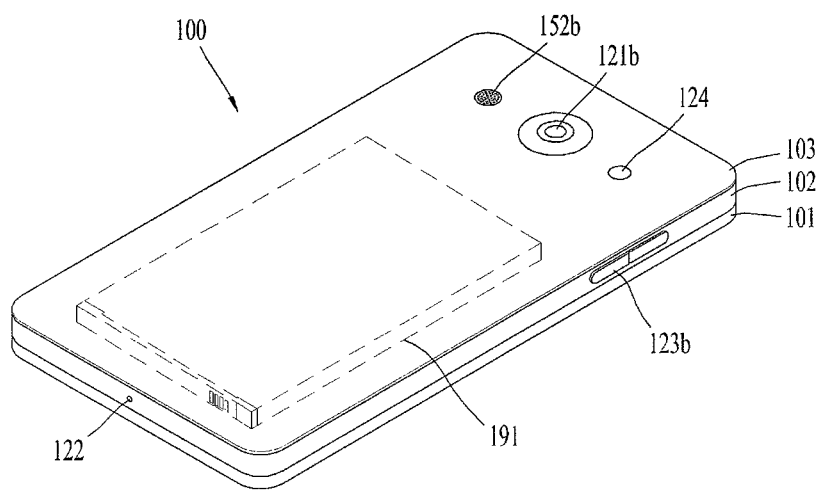

Reference is now made to FIGS. 3A-3C, where FIG. 3A is a block diagram of a mobile terminal in accordance with the present disclosure, and FIGS. 3B and 3C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 3A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 3A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like inputted or outputted through the above-mentioned components and/or runs application programs saved in the memory 170, thereby processing or providing a user with appropriate information and/or functions.

The controller 180 may provide or process information or functions appropriate for a user by processing signals, data, information and the like, which are input or output by the various components depicted in FIG. 3A, or activating application programs stored in the memory 170. As one example, the controller 180 controls some or all of the components illustrated in FIGS. 3A-3C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 3A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electro-technical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

Referring now to FIGS. 3B and 3C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the optical output unit 154, the first camera 121a, the second camera 121b, the first manipulating unit 123a, the second manipulating unit 123b, the microphone 122, the interface unit 160, and the like.

FIGS. 3B and 3C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 3A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 3B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 3C, a flash 124 is shown adjacent to the second camera 121b. When an image of a subject is captured with the camera 121b, the flash 124 may illuminate the subject.

As shown in FIG. 3C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In the following, a pairing method between the mobile terminal 100 and an IoT device according to the present invention is described in detail.

Figure 4:
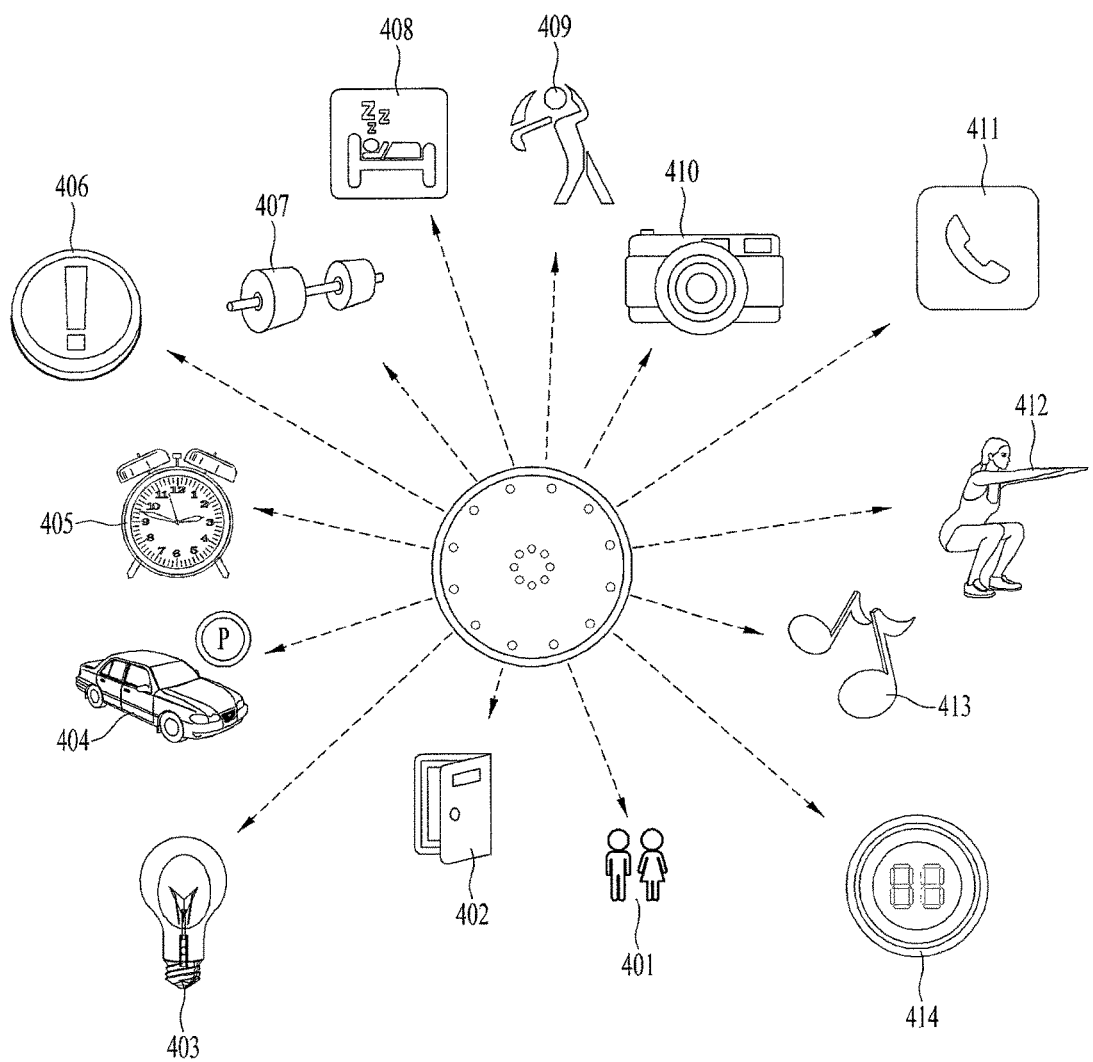
FIG. 4 is a diagram for various functions of an IoT device according to the present invention.

FIG. 4 is a diagram for various functions of an IoT device according to the present invention. After being paired with the mobile terminal, the IoT device 400 can perform various functions depending on a design. FIG. 4 illustrates functions capable of being performed by the IoT device. For example, the IoT device can perform a lost child prevention function 401, a door notification function 402, a light control function 403, a parked vehicle searching function 404, an alarm function 405, an emergency situation notification function 406, a health training pushup function 407, a sleep measuring function 408, a golf posture correcting function 409, a picture taking function 410, a phone calling function 411, a health training posture correcting function 412, a music control function 413, and a timer function 414. It is apparent that various functions other than the functions shown in FIG. 4 are able to be applied to the IoT device. Several functions among the aforementioned functions are explained in the following with a concrete example.

The IoT device can be utilized for a lost child prevention function 401. For example, when parents go to a place where a good many people are gathered and complex such as an amusement park or a department store with their child, the IoT device 400 equipped with the lost child prevention function 401 can be attached to the child in a form of a necklace or can be attached to a part of a body of the child. If the child carrying the IoT device equipped with the lost child prevention function is apart from the parents more than a predetermined distance, an alarm message or a voice warning is automatically sent to mobile terminals of the parents to indicate a location (i.e., a location of the child) of the IoT device. Hence, the parents can easily check the location of the child and it becomes a function capable of preventing lost child. And, if the child double taps a main body of the IoT device 400 in an emergency situation, it may be able to configure an alarm message and a phone call to be immediately sent to the parents. Among the lost child prevention function, the alarm message forwarding function can also be applied to the anti-theft of an important item (e.g., handbag). If the IoT device is carried in the important item, it may perform the anti-theft.

The IoT device can be utilized for a music control function 413. For example, when a user listens to music from a mobile terminal, if an IoT device 400 equipped with a music control function 413 is placed near the user, it is able to perform music control using the IoT device 400 instead of the mobile terminal. For example, it may play music by double tapping the IoT device 400, adjust volume of the music by rotating a main body of the IoT device 400 to the left and right, or play next music by double tapping the IoT device. The aforementioned functions can be configured in advance and programmed by manual.

The IoT device can be utilized for a light control function 403. For example, in a state that a light control gateway for controlling a light included in a specific place (e.g., home, office, park, etc.) is installed, it may be able to simultaneously or sequentially turn off or turn on all lights included in the place by utilizing the IoT device 400 equipped with the light control function 403. For example, it may be able to simultaneously or sequentially turn off the lights by double tapping the IoT device 400 and adjust brightness of the lights by rotating a main body of the IoT device 400 to the left and right. The aforementioned functions can be configured in advance and programmed by manual.

The remaining functions and new various functions can be implemented by utilizing the IoT device 400 using a scheme similar to the aforementioned lost child prevention function 401, the music control function 413, and the light control function 403.

Figure 5:
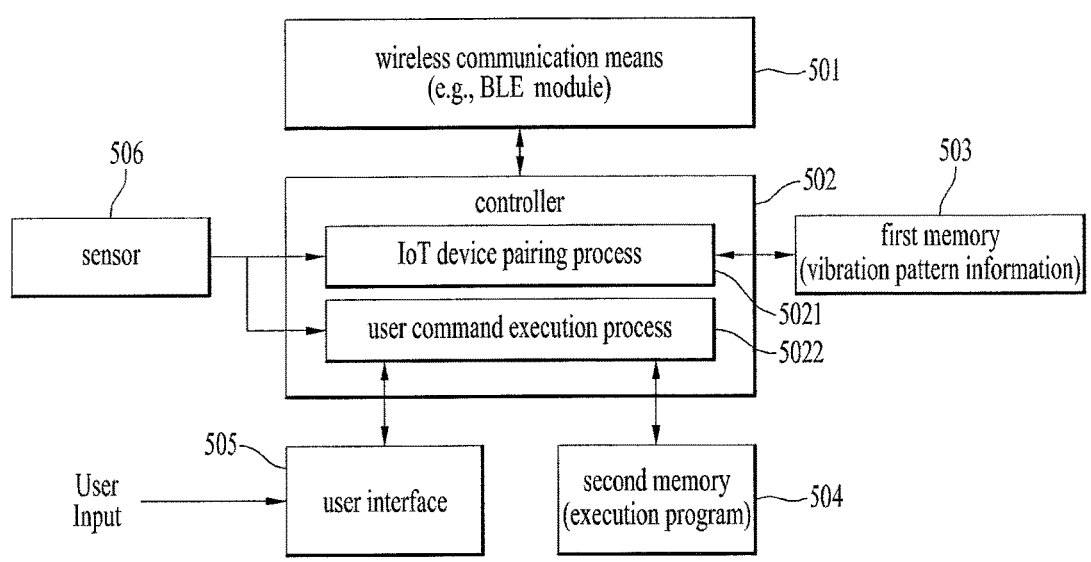
FIG. 5 is a block diagram for explaining an internal configuration of an IoT device according to the present invention.

FIG. 5 is a block diagram for explaining an internal configuration of an IoT device according to the present invention. The IoT device 400 can include a wireless communication means 501 capable of performing wireless communication with a mobile terminal, a first memory 503 in which vibration pattern information is stored, a second memory 504 in which an execution program including an application program is stored, a user interface 505 for receiving a user command, a sensor 506 for detecting a vibration, and a controller 502 for controlling the aforementioned configuration elements. Although it is not depicted, it is apparent that the IoT device can further include a microphone, a speaker, a flickering LED, and the like depending on an application function of the IoT device 400.

In relation to this, the wireless communication means 501 corresponds to a Bluetooth module capable of performing short-distance wireless communication in general. Yet, a Bluetooth low energy module (BLE module) more suitable for low power environment is recently adopted as the wireless communication means. However, this is just an example only for understanding the present invention. A short-distance wireless communication scheme is not restricted by the Bluetooth scheme. Moreover, if a new wireless communication technology appropriate for the IoT device is developed, it is apparent that it is able to develop the IoT device by applying the new wireless communication technology.

Although the first memory 503 and the second memory 504 are represented as a separate memory for clarity, it is apparent that the memories can be implemented as a single memory. In relation to this, if a vibration pattern of a vibration generated by the mobile terminal is recognized, the vibration pattern information stored in the first memory 503 is utilized for determining a part of the stored vibration pattern information matched with the vibration. Regarding this, it shall be described later in detail with reference to drawings. And, for example, the execution program stored in the second memory 504 includes an application program for implementing the application function mentioned earlier in FIG. 4. The execution program stored in the second memory 504 may correspond to a program included in the IoT device 400 at the time of initially manufacturing the IoT device 400 or a program downloaded from the mobile terminal after the IoT device 400 is paired with the mobile terminal.

The user interface 505 corresponds to a user input means of a predefined scheme according to a programmed manual of the execution program stored in the second memory 504. For example, if the execution program stored in the second memory 504 corresponds to a music control function 401, an operation of double tapping a main body of the IoT device 400 or an operation of rotating the main body of the IoT device 400 to the left and right can be configured to be recognized as a user command.

For example, the sensor 506 can be configured by an acceleration sensor to recognize a physical vibration of the main body of the IoT device 400. In relation to the present invention, the sensor 506 recognizes a vibration delivered from the mobile terminal and forwards a recognized result to a pairing process 5021 of the controller 520 to utilize the result for pairing execution. Regarding this, it shall be described in detail later. And, the sensor 506 recognizes a movement of the IoT device 400 and forwards the recognized movement to an execution process 5022 of the controller 502 to utilize the movement for implementing a specific function. For example, the sensor can be used for recognizing the movement of the IoT device 400 (i.e., movement of a user) in a manner of being attached to a part of a body of a user in the health training pushup function 407, the sleep measuring function 408, the golf posture correction function 409, the health training posture correction function 412, and the like mentioned earlier in FIG. 4.

The controller 502 controls the configuration elements of the IoT device 400. And, in relation to the present invention, the controller 502 includes at least two or more important control processes. First of all, the controller 502 includes a pairing process 5021 to perform pairing with an adjacent mobile terminal by utilizing vibration pattern information stored in the first memory 503. Secondly, the controller 502 includes an execution process 5022 to implement a user command or a specific application function according to an execution program (including a specific application program) stored in the second memory 504 and a user interface 505.

Figure 6:
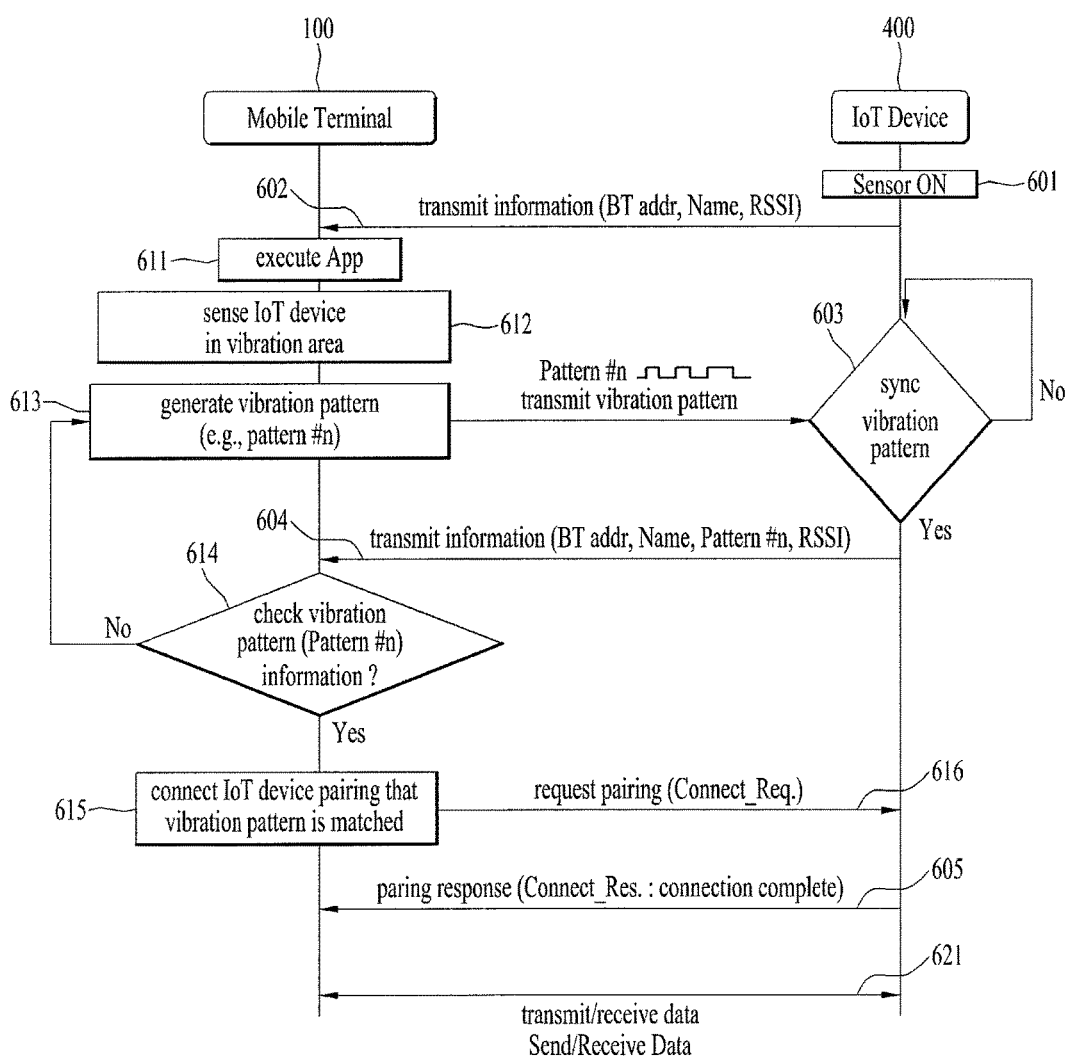
FIG. 6 is a flowchart for a pairing method using a vibration pattern between a mobile terminal and an IoT device according to the present invention.

In the following, a pairing method between a mobile terminal and an IoT device and a control method are explained in detail according to the present invention. FIG. 6 is a flowchart for a pairing method using a vibration pattern between a mobile terminal and an IoT device according to the present invention. Overall pairing process between a mobile terminal and an IoT device is explained in the following.

If power of the IoT device 400 is turned on, an operation of the sensor 506 starts [S601]. Subsequently, information on the IoT device is transmitted to a wireless communication unit 110 of the mobile terminal through a wireless communication unit 501 of the IoT device [S602]. The information can include an address (BT addr.) of the IoT device, a device name, signal strength (RSSI), and the like as legacy general information. And, the mobile terminal 100 can execute an application related to the present invention [S611]. For example, the mobile terminal may use an IoT utilization integration app such as "Smart IoT". The integration app can further include a specific application program for performing individual functions mentioned earlier in FIG. 4.

Figure 7A:
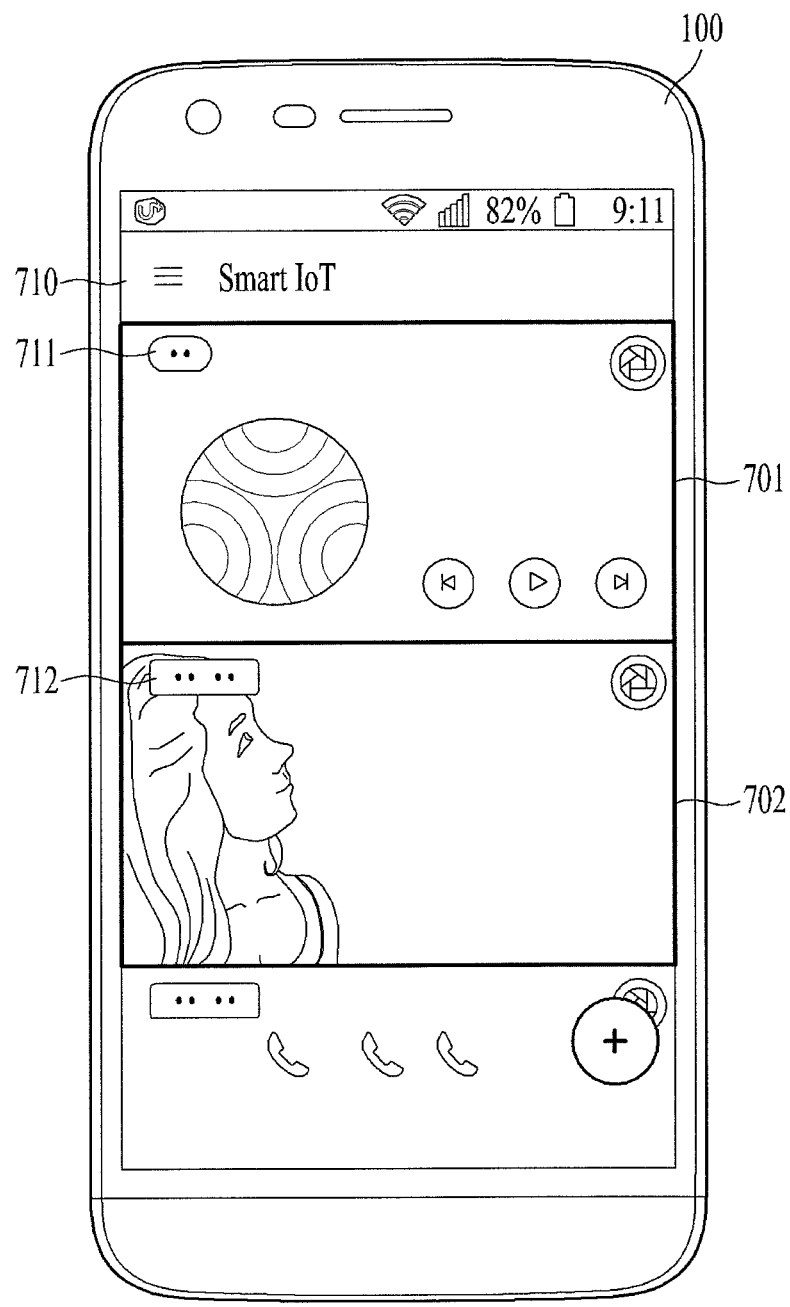
FIGS. 7a and 7b are diagrams for an example of configuring a vibration area according to an application which is displayed on a mobile terminal according to the present invention.

And, a vibration area can be prepared on the app screen to sense whether or not the IoT device 400 is contacted with the mobile terminal on the vibration area [S612]. In relation to this, FIG. 7a shows an example of configuring a vibration area 701/702 according to an individual application and FIG. 8 shows an example of configuring a single vibration area 801 in the integration app. Regarding configuration of the vibration area, it shall be described in detail with reference to FIGS. 7a, 7b and 8.

If the contact of the IoT device is recognized in the vibration area, the controller 180 of the mobile terminal generates a predefined vibration pattern [S613]. For example, referring to FIG. 9, there are pluralities of vibration patterns (pattern #1, #n, #k). Among a plurality of the vibration patterns, a specific vibration pattern (pattern #n) is used to generate a vibration by utilizing a defined vibration parameter [S613]. For example, referring to FIG. 10, a plurality of the vibration patterns are designated according to an application type. In order to execute an application, it is necessary to generate a specific vibration pattern corresponding to the application, by which the present invention may be non-limited. If the IoT device 400 performs a fixed single function only, it may utilize a predefined single vibration pattern only. Regarding the vibration pattern, it shall be described later in detail with reference to FIGS. 9, 10, and 11.

Figure 11:
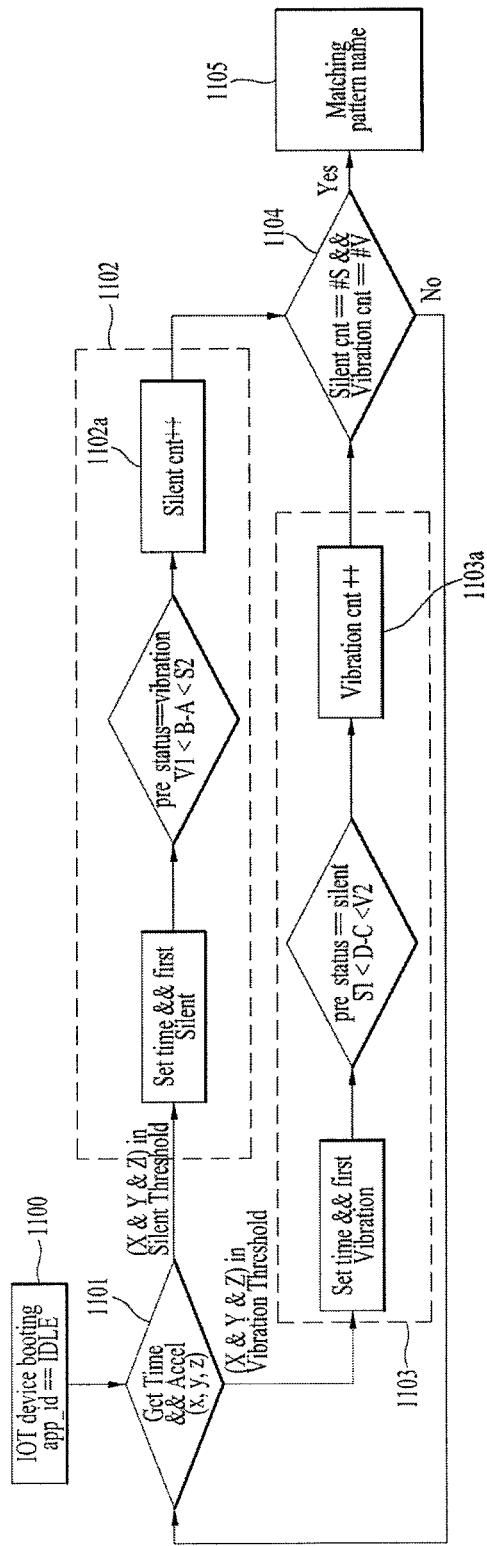
FIG. 11 is a flowchart for a method of determining a vibration pattern sync applied to the present invention.

If a vibration corresponding to the vibration pattern #n is generated, the sensor 506 of the IoT device 400 detects the generated vibration and the controller 502 performs a vibration pattern sync process 603. For reference, the vibration pattern sync process 603 corresponds to a part of the aforementioned pairing process 5021 of the controller 502. In relation to this, FIG. 11 show details of the vibration pattern synch process 603.

If a vibration pattern is recognized through the vibration patter sync, the controller 502 of the IoT device checks vibration pattern information matched with the recognized vibration using the vibration pattern information stored in the first memory 503. For example, if a vibration pattern generated by the mobile terminal corresponds to a vibration pattern #n, the vibration pattern is detected by the sensor 506 of the IoT device and a vibration pattern checked by the vibration synch determination process 603 mentioned earlier in FIG. 11 may also become the vibration pattern #n. The controller 502 of the IoT device transmits information including the checked vibration pattern information (e.g., vibration pattern #n) again through the wireless communication means 501 [S604]. Hence, the information includes an address (BT addr.), a device name, recognized vibration pattern information (e.g., pattern #n), and signal strength (RSSI).

The mobile terminal checks that the vibration pattern information (pattern #n) is included in the information transmitted by the IoT device and determines whether or not the information is identical to the vibration pattern generated by the mobile terminal [S614]. As a result of the step S614, if there exists an IoT device, which has transmitted the information including the same vibration pattern information (e.g., pattern #n), the mobile terminal determines the IoT device as a pairing target device and performs pairing [S615]. As a result of the step S614, if the vibration pattern information transmitted by the IoT device is different from the vibration pattern generated by the mobile terminal, it may return to the step S613 (generating a new vibration pattern) and perform the step again. By doing so, although the mobile terminal generates a specific vibration (e.g., pattern #n) due to a mistake operation not intended by a user, if the same vibration pattern information (pattern #n) corresponding to the specific vibration is not retransmitted by the IoT device, it is able to make a following pairing process not to be executed.

When vibration pattern informations are matched with each other, a step of paring a mobile terminal with an IoT device is described in the following. First of all, the mobile terminal 100 transmits a pairing request signal (Connect_Req) to the IoT device [S616] and the IoT device 400 transmits a response signal (Connect_Res) to the mobile terminal to accept pairing. By doing so, the pairing between the mobile terminal and the IoT device is completed [S605]. After the pairing is made [S605], predefined data are transmitted and received between the mobile terminal and the IoT device [S621]. Yet, a type of the data is differently determined according to an application type of the IoT device 400. As mentioned in the foregoing description, the data is transmitted and received according to a manual programmed to each application in general.

Figure 7B:
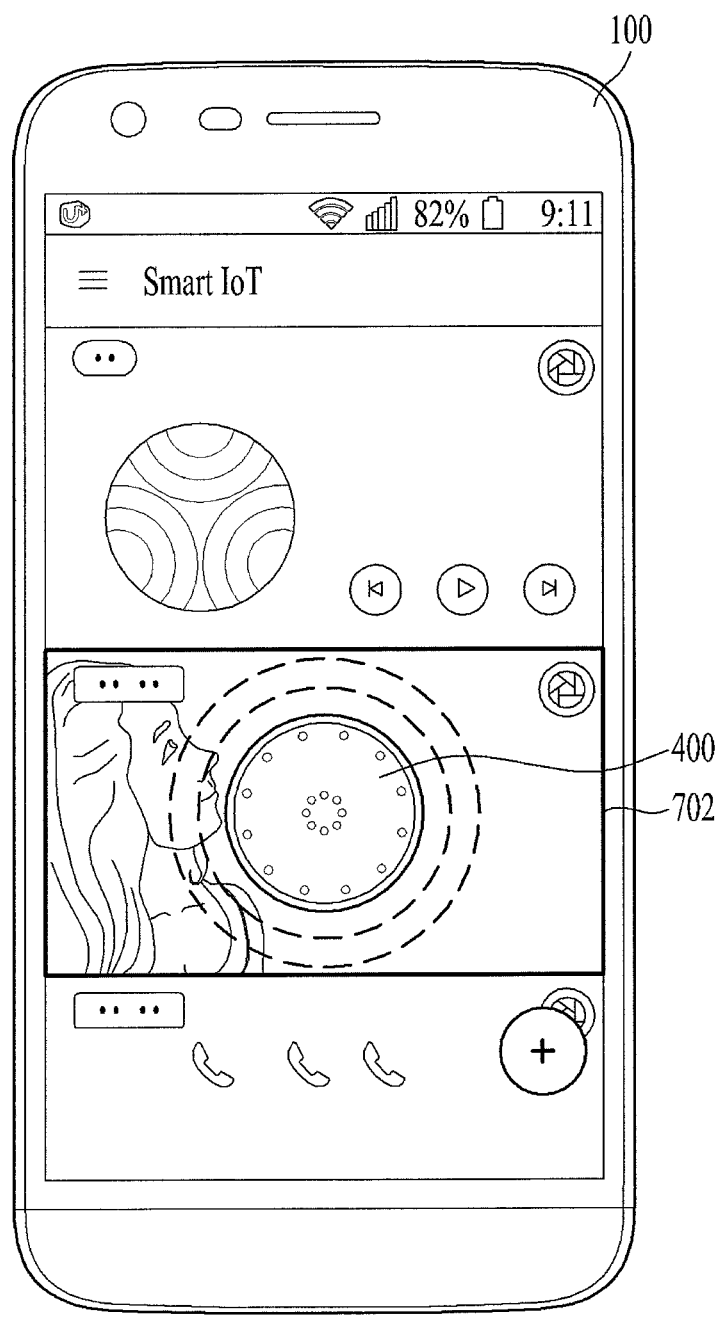
Figure 8:
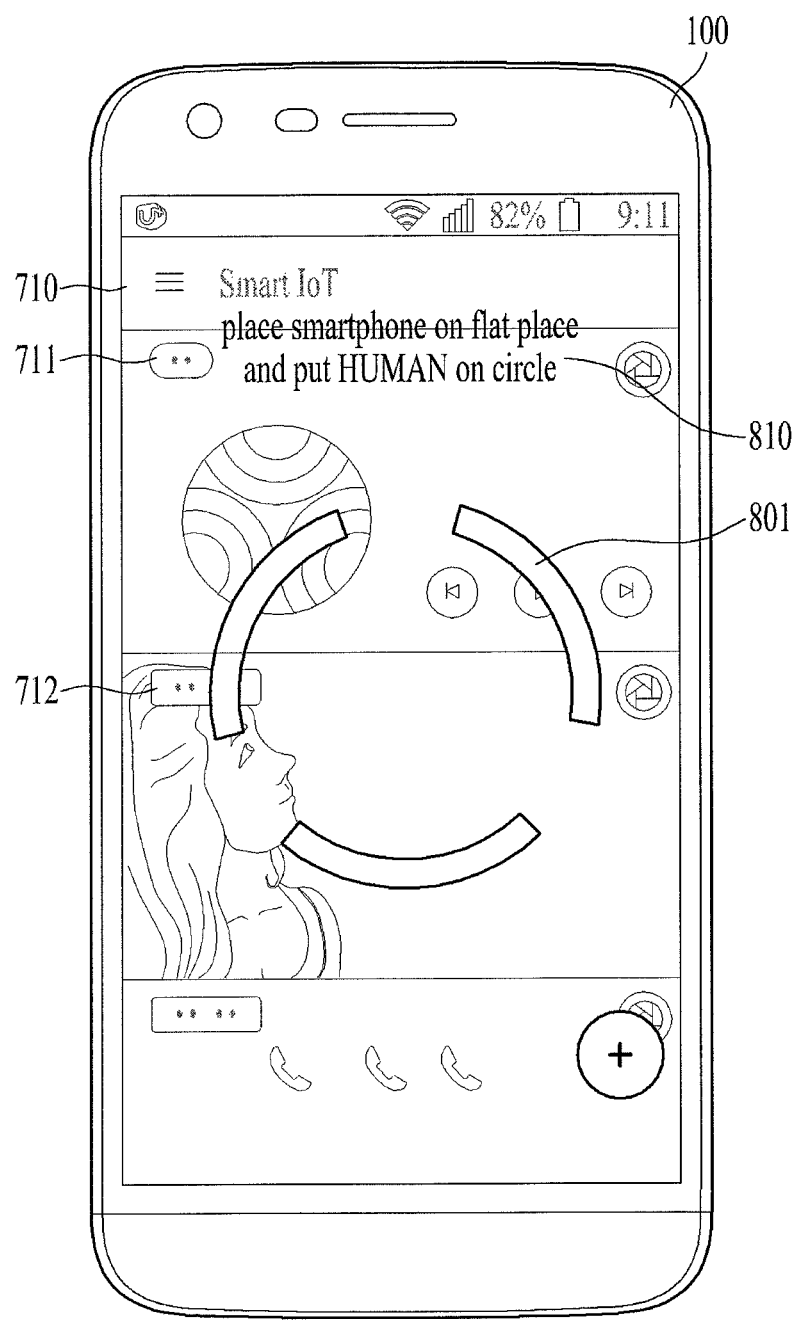
FIG. 8 is a diagram for an example of configuring a single vibration area on a mobile terminal according to the present invention.

In relation to this, FIGS. 7a and 7b are diagrams for an example of configuring a vibration area according to an application which is displayed on a mobile terminal. FIG. 8 is a diagram for an example of configuring a single vibration area on a mobile terminal.

Referring to FIG. 7a, a plurality of individual applications are included in an integration app 710. For example, a music control application 711 and a lost child prevention application 712 are included in the integration app. According to the present invention, in order to pair the mobile terminal with the IoT device 400, the mobile terminal is equipped with vibration areas 701/702 to generate vibration with a designated vibration pattern. In particular, for example, the mobile terminal is equipped with a first vibration area 701 for the music control application 711 and a second vibration area 702 for the lost child prevention application 712. Hence, if a user puts the IoT device on either the first vibration area 701 or the second vibration area 702, paring between the mobile terminal and the IoT device can be completed. For example, as shown in FIG. 7b, if the user intends to utilize the IoT device 400 as a lost child prevention function, the user puts the IoT device 400 on the second vibration area 702 for the lost child prevention application 712 to make the IoT device to be contacted with the second vibration area 702. If the controller 180 of the mobile terminal recognizes that the IoT device is contacted with the second vibration area 702, the controller generates a vibration in the second vibration area 702 with a designated vibration pattern. If the IoT device recognizes the vibration, the pairing between the mobile terminal and the IoT device can be completed. Hence, the user can complete the pairing via an intuitive operation of placing the IoT device 400 on the vibration area of the mobile terminal 100. In relation to this, although the first vibration area 701 and the second vibration area 702 are represented as the whole area in which a corresponding application is displayed, a part of an application screen can be configured as a vibration area according to a different embodiment.

On the contrary, referring to FIG. 8, although a music control application 711 and a lost child prevention application 712 are included in an integration app 710 as a plurality of individual applications, a specific area at the top of a touch screen can be configured as a vibration area 801 irrespective of the individual applications 711/712. The embodiment of FIG. 8 can be more usefully utilized in an embodiment that an application function of the IoT device 400 is determined irrespective of the individual applications 711/712. Or, the embodiment of FIG. 8 can also be utilized for a case that a process of selecting one of the individual applications 711/712 is additionally prepared after the pairing while the paring between the mobile terminal and the IoT device is performed irrespective of the individual applications 711/712. If a text message 810 for guiding a user to put the IoT device on a vibration area 801 is provided to the user, it may be able to enhance user convenience.

Figure 9:
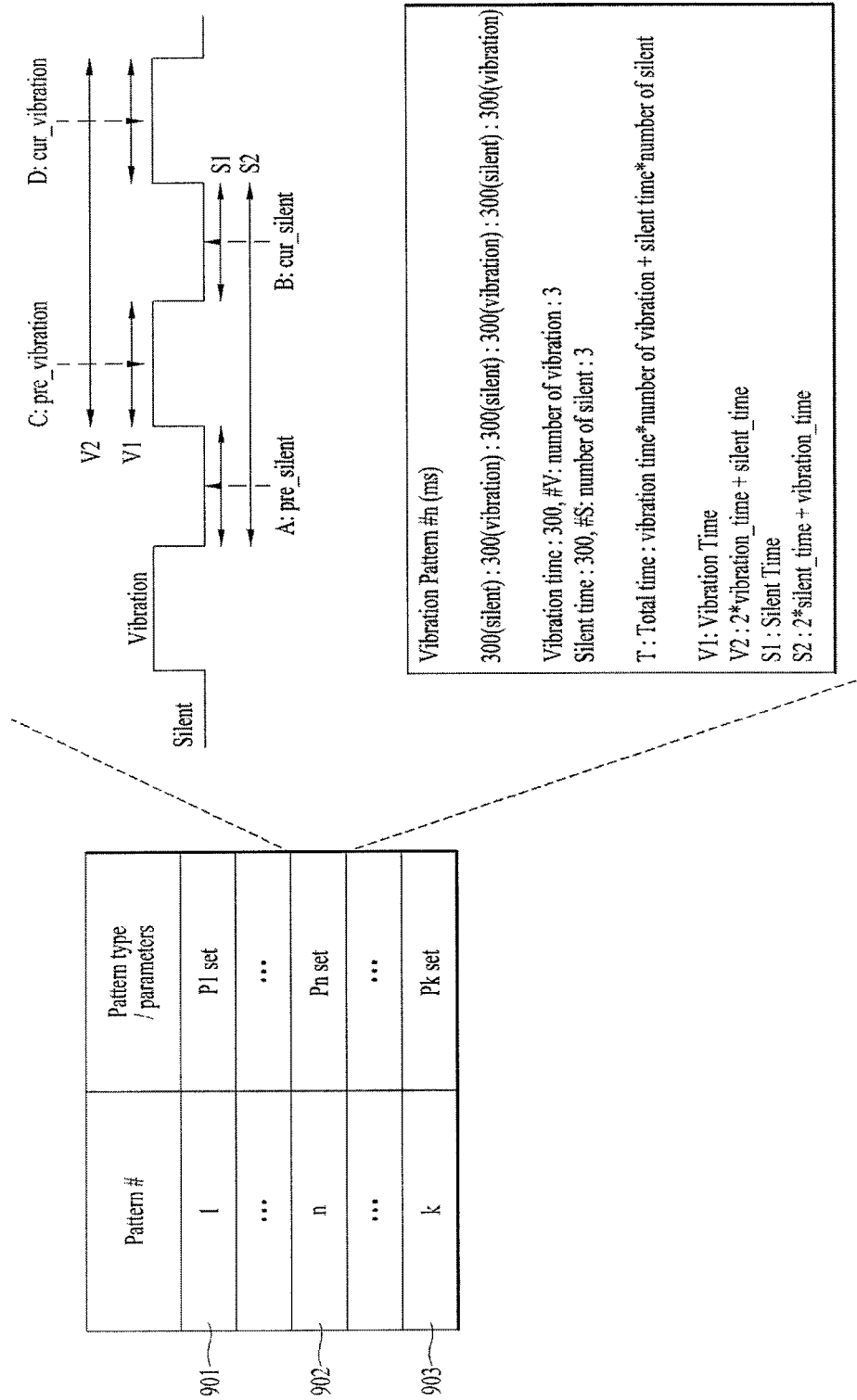
FIG. 9 is a diagram for an example of a vibration pattern type and a vibration parameter used in the present invention.

FIG. 9 is a diagram for an example of a vibration pattern type and a vibration parameter used in the present invention. Specifically, FIG. 9 illustrates at least one or more vibration pattern types and a vibration parameter of a specific vibration pattern type (e.g., vibration pattern #n) stored in a memory 170 of the mobile terminal 100 and a first memory 503 of the IoT device 400.

In relation to the present invention, it may consider both cases that the number of vibration pattern type corresponds to 1 and 2. In particular, in case of using one vibration pattern only, although a plurality of the individual application vibration areas 710/702 mentioned earlier in FIG. 7a are prepared, the number of vibration pattern corresponding to a plurality of the vibration areas corresponds to 1. In this case, paring can be performed in a manner that the IoT device checks whether or not the single vibration pattern is recognized only. Instead, the mobile terminal 100 determines a vibration area in which the pairing is performed among the vibration areas 710 and 720 and transmits data suitable for a corresponding application (e.g., 711 or 712). By doing so, it is able to distinguish an application according to a function. In case of the vibration area 801 existing on the integration app 710, it is natural to utilize a fixed vibration pattern only.

On the contrary, in case of utilizing a plurality of vibration pattern types, it is able to configure a vibration pattern type and an individual application type by one to one. For example, as shown in FIG. 10, a music control application 1001 utilizes a vibration pattern #1, a lost child prevention application 1002 utilizes a vibration pattern #n, and a light control application 1003 utilizes a vibration pattern #k. Hence, the IoT device 400 can recognize a type of an application based on a type of a generated vibration pattern. This can be useful for stably controlling the IoT device. In some cases, it may be able to configure pairing to be rejected for an unwanted application type or an unfeasible application type.

For example, FIG. 9 shows a case that there exists k number of vibration pattern types. In particular, a vibration pattern #1 is configured by a P1 vibration parameter (P1 set), a vibration pattern #n is configured by a Pn vibration parameter (Pn set), and vibration pattern #k is configured by a Pk vibration parameter (Pk set). In relation to this, the vibration parameters ("P1 set", "Pn set", 'Pk set") correspond to information used for defining occurrence time and count of a vibration period and a silent period for determining a vibration pattern type. For example, the right side part of FIG. 9 shows the vibration parameter (Pn set) of the vibration pattern #n. In particular, the vibration parameter (Pn set) of the vibration pattern #n configures 3 silent periods and 3 vibration periods in an order of "silent→vibration→silent→vibration→silent→vibration" and time for each period is identically configured by 300 ms. Hence, although it is not depicted in FIG. 9, it is apparent that the P1 vibration parameter (P1 set) for constructing the vibration pattern #1 and the Pk vibration parameter (Pk set) for constructing the vibration pattern #k are configured in a manner of being different from the "Pn set".

It may be able to define more variables to precisely recognize the vibration parameter "Pn set" related to the vibration pattern #n. For example, it may define and utilize T (Total time), V1 (vibration_time), V2 (2*vibration_time+silent_time), S1 (Silent_time), and S2 (2*silent_time+vibration_time). And, it may be able to respectively define and utilize A (pre_silent), B (cur_silent), C (pre_vibration), and D (cur_vibration) as a variable for indicating a state of each period. In relation to this, the controller 502 of the IoT device 400 can precisely determine a vibration pattern of a vibration generated by the mobile terminal by utilizing the various variables.

FIG. 11 is a flowchart for a method of determining a vibration pattern sync applied to the present invention. FIG. 11 illustrates a sort of a software program installed in a paring process 5021 in the controller 502 of the IoT device. FIG. 11 illustrates a process of precisely recognizing a vibration pattern by utilizing variables applied to the vibration parameters ("P1 set", "Pn set", "Pk set").

If program execution starts [S1100], whether or not a vibration recognized by the sensor 506 occurs, a vibration period interval, a silent period interval, and he like are measured [S1101]. The step of counting the number of silent periods [S1102] and the step of counting the number of vibration periods [S1103] are executed by utilizing values measured in the step S1101. In the steps S1102 and S1103, the existence of the silent period and the existence of the vibration period are checked by utilizing the aforementioned vibration parameter variables (e.g., T, V1, V2, S1, S2, A, B, C, and D). If the silent period and the vibration period exist, the number of the silent periods and the number of the vibration periods are increased by 1 [S1102a, S1103a]. Subsequently, it is able to determine whether or not the currently determined numbers of the silent periods and the vibration periods are identical to the numbers of the silent periods (#S) and the vibration periods (#V) applied to a specific vibration pattern type (e.g., pattern #n) [S1104]. In the step S1104, if the numbers of the silent periods (#S) and the vibration periods (#V) of the specific vibration pattern type (e.g., pattern #n) are identical to the numbers of the silent periods and the vibration periods recognized in the steps S1102a and S1103a, it is able to recognize that the vibration pattern type (e.g., pattern #n) is generated [S1105]. In the step S1104, if the numbers of the silent periods and the vibration periods do not arrive at the number as much as the numbers of the silent periods (#S) and the vibration periods (#V), it may return to the step S1101 and repeat the aforementioned procedure. The step S1105 can be performed by utilizing the vibration pattern information stored in the first memory 503 of the IoT device [S1105].

Figure 12:
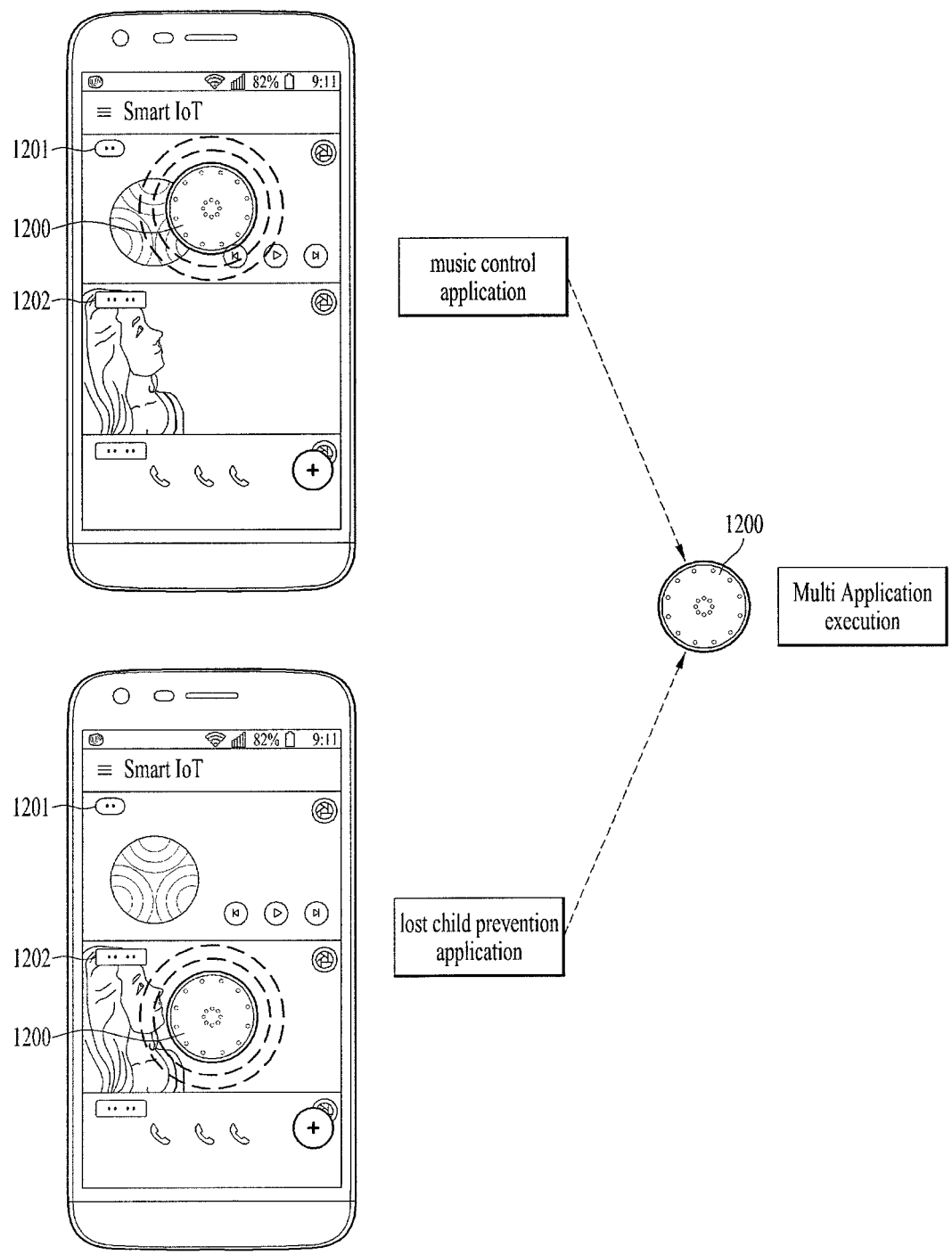
FIG. 12 is a diagram for an example of a pairing method of an IoT device capable of implementing a plurality of application functions applied to the present invention.

FIG. 12 is a diagram for an example of a pairing method of an IoT device capable of implementing a plurality of application functions applied to the present invention. The IoT device 400 executes a specific application function (e.g., one of the functions mentioned earlier in FIG. 4) only, deletes a legacy application function to execute a different application function, and updates the IoT device with a new application function in a manner of being paired with the mobile terminal again. Or, depending on a product design, the IoT device can be developed as an IoT device configured to perform a specific function only which is determined at the time of manufacturing the IoT device without an update function. The aforementioned pairing method between the mobile terminal and the IoT device using a vibration pattern, as mentioned in the foregoing description, can also be applied to an IoT device configured to perform a single function only.

In relation to this, the pairing method between the mobile terminal and the IoT device using a vibration pattern can be identically applied to an IoT device 1200 capable of implementing a plurality of application functions. For example, as mentioned earlier in FIGS. 6 and 7a, if a user puts the IoT device 1200 on a screen of a corresponding application 1201 to perform a first application function (e.g., music control function), first pairing is automatically performed using a vibration pattern. Subsequently, the IoT device 1200 is utilized as the first application function (music control function). In relation to this, as mentioned earlier in FIG. 7a, assume that a vibration area is already set to the top of the touch screen of the first application 1201.

The user may repeat the aforementioned procedure to use the IoT device as a second application function (e.g., lost child prevention function) instead of the first application (music control function). For example, as mentioned earlier in FIGS. 6 and 7a, if the user puts the IoT device 1200 on a screen of a second application 1202, second pairing is automatically performed using a vibration pattern. In relation to this, as mentioned earlier in FIG. 7a, assume that a vibration area is already set to the top of the touch screen of the first application 1202.

Hence, the IoT device 1200 can perform multi-application function via the pairing which is performed two times. Yet, there may exist a case that it is difficult to utilize a plurality of application functions in the IoT device 1200 depending on a property of an application function. For example, when application functions have an identical user interface manual (e.g., multiple tapping the top of the main body, rotating the main body to the left and right, etc.), utilizing both the music control function 413 and the light control function 403 mentioned earlier in FIG. 4 at the same time can be restricted. In order to use the functions having the same user interface manual at the same time, it is necessary to have a separate user interface manual to distinguish a user command. For example, it may be able to have a function button (not depicted) on the exterior of the IoT device 1200. In particular, whenever the IoT device is utilized as the first application function (music control function 413) or the second application function (light control function 403), it is able to determine an application function to be used using the function button and then it is necessary to utilize a user interface manual.

In relation to this, according to a different embodiment, it may be able to omit the second pairing. In particular, if the first pairing is already performed on the first application function, it may be able to update the IoT device 1200 by data of the second application function without performing the second pairing. By doing so, it may be able to utilize multiple application functions. In this case, although the second pairing is not performed, it is necessary to perform a procedure of updating the IoT device by the data of the second application 1302 function by generating a designated vibration pattern in a manner of placing the IoT device 1200 on the vibration area of the screen of the second application 1302.

The present invention can be implemented with a code readable by a computer in a media in which a program is recorded. The media readable by the computer includes all kinds of recording devices in which data readable by a computer system are stored. The examples of the recording media readable by the computer may include a HDD (hard disk drive), an SSD (solid state disk), an SDD (silicon disk drive), a ROM, a RAM, a CD-ROM, a magnetic tape, a floppy disc, an optical data storing device and the like. And, implementing in a form of a carrier wave (e.g., transmission via the internet and the like) is also included. And, the computer can include the controller 180 of the mobile terminal or the controller 502 of the IoT device. While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A method of pairing an IoT (Internet of things) device with a mobile terminal, comprising the steps of:
dividing a plurality of application screens and displaying the plurality of the application screens in a touch screen of the mobile terminal;
providing at least one vibration area on each of the plurality of the application screens;
when the IoT device is contacted with a specific vibration area of the at least one vibration area, generating, in the specific vibration area, a vibration pattern corresponding to a specific application of the specific vibration area;

receiving vibration pattern information corresponding to the generated vibration pattern from the IoT device; and performing pairing with the IoT device when the received vibration pattern information is identical to the generated vibration pattern.

2. The method of claim 1, further comprising transmitting a data suitable for a type of the specific application after the pairing is performed.

3. A mobile terminal, comprising:
a wireless communication unit configured to transceive data with an IoT (Internet of Things) device;
a touch screen configured to divide a plurality of application screens and display the plurality of the application screens, the touch screen having at least one vibration area on each of the plurality of the application screens and configured to recognize whether the IoT device is contacted with a specific vibration area of the at least one vibration area; and
a controller configured to:
when the IoT device contacted with the specific vibration area of the at least one vibration area is recognized, generate, in the specific vibration area, a vibration pattern corresponding to a specific application of the specific vibration area, and
when vibration pattern information identical to the generated vibration pattern is received from the IoT device via the wireless communication unit, perform pairing with the IoT device via the wireless communication unit.

4. The mobile terminal of claim 3, wherein the controller is configured to transmit a data suitable for a type of the application after the pairing is performed.

* * * * *